United States Patent [19]
McGrath et al.

[11] Patent Number: 6,071,063
[45] Date of Patent: Jun. 6, 2000

[54] WHEELED LOAD TRANSPORTER

[75] Inventors: Vincent James McGrath; Christopher John McGrath, both of Auckland, New Zealand

[73] Assignee: McGrath Industries Limited, Auckland, New Zealand

[21] Appl. No.: 08/765,203

[22] PCT Filed: Jul. 21, 1995

[86] PCT No.: PCT/NZ95/00065

§ 371 Date: Jan. 3, 1997

§ 102(e) Date: Jan. 3, 1997

[87] PCT Pub. No.: WO96/03304

PCT Pub. Date: Feb. 8, 1996

[30] Foreign Application Priority Data

Jul. 25, 1994 [NZ] New Zealand ............................ 264088

[51] Int. Cl.[7] ...................................................... B65G 1/04
[52] U.S. Cl. ........................... 414/529; 414/532; 414/536; 198/781.06; 280/253; 280/263
[58] Field of Search ..................... 414/507, 529, 414/530, 532, 533, 535, 536; 180/253, 263, 326, 321, 322, 333, 78, 6.32; 198/781.06

[56] References Cited

U.S. PATENT DOCUMENTS

| | | | |
|---|---|---|---|
| 3,031,024 | 4/1962 | Ulinski | 180/253 |
| 3,279,631 | 10/1966 | McCartney | 414/532 |
| 3,292,725 | 12/1966 | Hlinsky . | |
| 3,337,231 | 8/1967 | Drake | 180/253 |
| 3,690,485 | 9/1972 | Fischer et al. | 414/529 |
| 3,709,450 | 1/1973 | Watts et al. | 414/529 |
| 3,788,444 | 1/1974 | McWilliams | 180/253 |
| 3,848,692 | 11/1974 | Messner et al. | 180/253 |
| 3,887,095 | 6/1975 | Suzuki | 180/253 |
| 3,998,288 | 12/1976 | Aoki | 180/253 |
| 4,787,808 | 11/1988 | Shimoji et al. | 414/536 |
| 5,478,190 | 12/1995 | Helton | 414/530 |
| 5,525,025 | 6/1996 | Ootmar Ten Cate et al. | 414/529 |

*Primary Examiner*—Douglas Hess
*Attorney, Agent, or Firm*—Young & Thompson

[57] ABSTRACT

A wheeled transporter for air cargo includes a load carrying platform having rollers, connected at one edge to a power console incorporating a prime mover, and supported at the other edge with unpowered castoring wheels. The transporter is driven by two steerable wheels located beneath the console adjacent opposite ends. Each steerable wheel is driven by a reversible motor, and is steerable so that when one wheel is turned in one direction the other is turned in an opposite direction. The transporter can thus be driven in either direction along path (X), and turned or rotated on (Z). By turning the wheels through 90 degrees to the longitudinal direction, the transporter can be driven along a path (Y) in either direction, and steered by varying the differential speed of the wheels. A container carried on the deck can be moved and rotated in directions X', Y' and Z'.

26 Claims, 14 Drawing Sheets

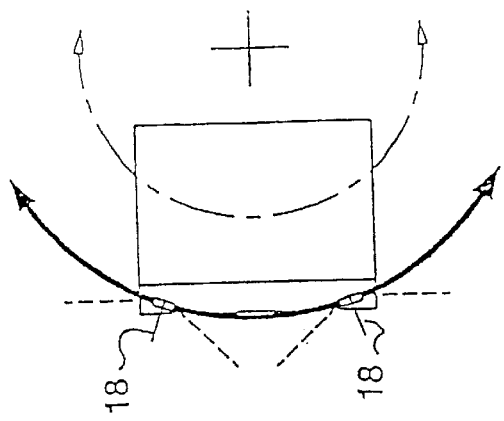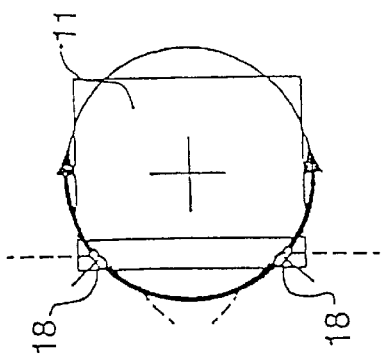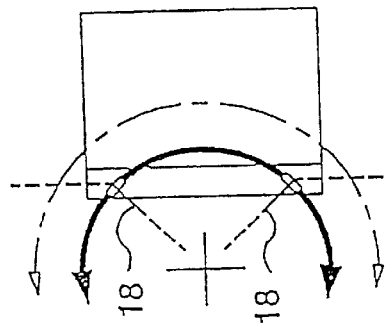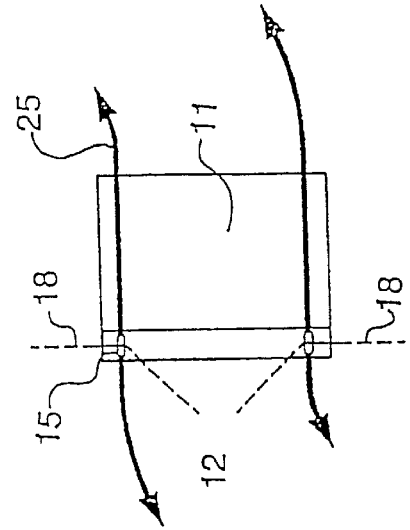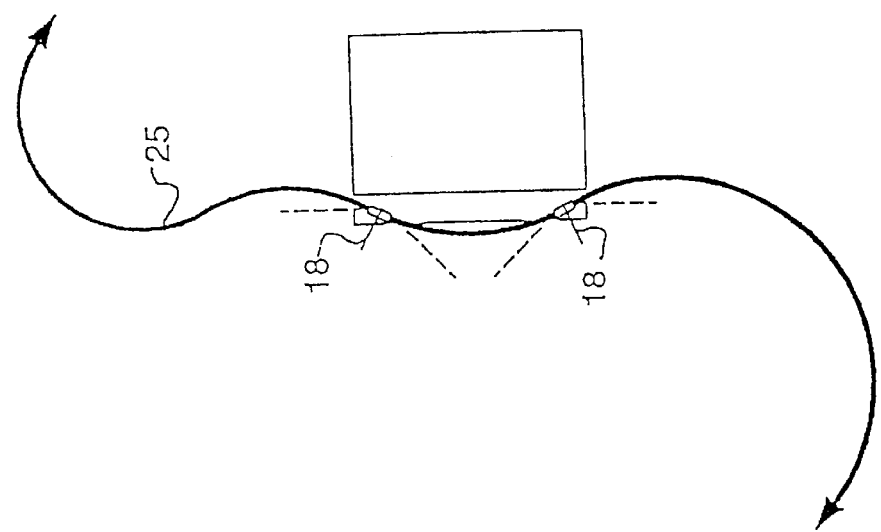

WHEELED LOAD TRANSPORTER

TECHNICAL FIELD

This invention relates to wheeled load transporters and is applicable particularly, but not exclusively, to wheeled load transporters for use in the transportation and transfer of palletised aircraft freight units.

BACKGROUND ART

Typical air cargo facilities utilise "fixed integrated" handling equipment for moving and storing the heavy fragile aircraft containers. Within these handling systems the method of transporting and manipulating the containers involves a combination of rail or track mounted transfer vehicles, transfer conveyors, orientation decks and turntables. The machinery is fixed in place and linked together to facilitate the movement of containers across the equipment system.

Such systems wherein the machinery is fixed in place, pose limitations on cargo handling in that the container can only be moved along specific pathways to fixed transfer stations. Moreover there is a wastage in equipment in that specific equipment is only used at the time of container transfer at the specific location.

OBJECT

It is an object of the present invention to provide a wheeled load transporter which addresses the above limitations, or one which will at least provide the public with a useful choice.

STATEMENT OF INVENTION

According to one aspect of the present invention there is provided a wheeled transporter including at least three ground engaging load carrying wheels, at least a first of said wheels being a steerable and drivable wheel and at least a second of said wheels being a castoring wheel not being capable of being driven.

According to another aspect of the present invention there is provided a wheeled load transporter including at least three ground engaging load carrying wheels, at least a first and a third of said wheels being steerable about respective substantially vertical axes, and steering means operable to steer said first and third wheels such that when the first wheel is turned in a clockwise direction about the vertical axis thereof the third wheel is turned in an anti-clockwise direction about the vertical axis thereof and vice versa, and in which at least a second of said wheels is not capable of being driven.

Preferably the first and third wheels are drivable wheels. The second wheel may be a castoring wheel.

Conveniently, the second wheel is positioned outside any vertical plane passing through both of the first and third wheels.

Advantageously, the first and third wheels can each be turned through a steering angle between 90 degrees and 180 degrees.

Preferably the first and third wheels at one end of the steering angle through which they may be turned are substantially parallel.

Conveniently, at least one of the first and third wheels is brakable for additional transporter steering purposes, independently of the other of the first and third wheels. Both of the first and third wheels may be brakable independently of the other.

Advantageously, a control position is provided on the transporter for a driver thereof, the control position including driving and/or braking and/or steering controls. Two of the control positions may be provided each having one of more of the controls, the control positions being spaced apart at opposite ends of the transporter.

Preferably, the or both of the control positions are located in or near a vertical plane through the steering axes of the first and third wheels.

According to a further aspect of the invention there is provided a wheeled transporter including a load carrying platform having disposed along the length thereof, in spaced relationship, a plurality of load presence detection means, conveyor means for moving the load along the platform, the conveyor means being started and stopped in response to signals from the load presence detection means.

According to another aspect of the present invention there is provided a wheeled transporter, including a load carrying platform comprising a plurality of powered rollers drivable in forward and reverse directions, mounted thereon by means of adjustable mounts whereby said rollers may be raised or lowered, said rollers being arranged in groups such that a container may be moved in longitudinal and transverse directions and rotated about a vertical axis by powering appropriate rollers in said groups. The platform may also be provided with low friction support means for providing a low friction support for a container as it is moved relative to the platform.

According to yet another aspect of the present invention there is provided a wheeled transporter, substantially as described above, incorporating a servo controlled steering system for steering of said first and third wheels, said steering system comprising; a first and second hydraulic ram with piston rods thereof (which may form part of a common piston rod) connected together, for providing power to steer said first wheel and third wheels simultaneously but in opposite directions, a servo valve for controlling hydraulic fluid to said hydraulic rams mounted so as to move with said piston rods, and linkage means connected at one point to an operating member of said servo valve and operated by an input from a steering column to produce relative movement between said operating member and said servo valve to operate said valve to allow hydraulic fluid to flow to one or other of said hydraulic rams, and thus move said servo valve in a direction to reduce said relative movement.

According to another aspect of the present invention there is provided a control system for providing a control output; comprising a linkage assembly having a base frame, a first pivot mount and at least two second pivot mounts movably located relative to said frame member, first and second link arms each pivotally and respectively mounted at first and second ends thereof to said first pivot mount and one and other of said second pivot mounts, first actuating means mounted relative to said base frame for moving said first pivot mount, and second actuating means mounted relative to said base frame for moving said second pivot mounts together substantially in opposite directions in direct inverse proportion to each other, said control output being obtained by linking to said first and second link arms such that pivotal movement of said link arms by said first and second actuating means causes corresponding control output.

With such a construction, the control output may be linked to first and second control means for respectively controlling forward and reverse drive of said first and third wheels, so that they are moved together by operation of the first actuating means to thus control synchronised drive of the first and third wheels at variable speeds in for example, a forward direction. The first and second control means may also be moved in opposite directions in direct inverse proportion to each other by operation of the second actuating means to thus control synchronised drive of said wheels at varying speeds in for example opposite directions.

The second actuating means may additionally incorporate an adjustment device for moving said second pivot mounts in variable proportion relative to each other. In this case the control output may additionally involve movement in opposite directions in varying inverse proportion to each other, by operation of the second actuating means. By linking the control output to the first and second control means the drive of the wheels may be controlled at varying relative speeds in for example opposite directions.

The first linkage actuating means may comprise any suitable means whereby the first pivot points may be moved together. For example this may comprise: lever means having a handgrip portion and a link attachment portion, pivotally mounted relative to said base frame, and link means for linking between said lever means and said first pivot mount.

With this arrangement, the lever means may be moved by manual operation of the handgrip to thereby move the first pivot mount.

The second linkage actuating means may comprise any suitable means whereby the second pivot points may be moved in direct inverse proportion or variable inverse proportion relative to each other. For example this may comprise: two lever means having link attachment portions, both pivotally mounted about a common axis relative to said base frame, with said link attachment portions on opposite sides of a plane passing through said common axis, variable linkage means for variably linking said two lever means together, said variable linkage means comprising a handgrip member whereby said variable linkage may be varied and whereby said two lever means may be pivotally moved about said common axis, and respective link means for respectively linking between said link attachment portions and said second pivot mounts.

With this arrangement, the two lever means may be moved together in opposite directions by manual operation of the handgrip due to the attachment point being on opposite sides of a plane through the pivot axis. By varying the variable linkage between the two lever means, the two lever means may be moved in varying proportions relative to each other.

The first and second linkage actuating means may also comprise positioning means for locating said pivot points when not being moved. In this way the controls for the motors can be operated relative to a fixed datum, thus ensuring accurate control.

The positioning means may comprise for example, at least one hydraulically operated locking means having a cylinder member and a piston member slidable therein, with valve means for controlling a flow of hydraulic fluid in said cylinder to thereby control movement of said piston relative thereto.

In the case wherein two control positions are provided for the transporter, each having a separate control system, the first and second control means of each control system may comprise a common connecting means for selectively connecting one of said systems to a motor control, and isolating the other of said systems from said motor control.

The connecting means may involve any suitable means for achieving the purpose. For example this may involve a hydraulically operated link means comprising two pistons movable within separate regions of a single cylinder, or within separate cylinders regions, with valve means for controlling a flow of hydraulic fluid in each of said cylinder regions to thereby selectively control movement of said pistons relative thereto.

BRIEF DESCRIPTION OF THE DRAWINGS

Embodiments of the invention will now be described, by way of example only, with reference to the accompanying drawings in which:

FIGS. 4 to 8 show, in diagrammatic form only, plan views of various steering configurations of the transporter.

BEST MODES FOR CARRYING OUT THE INVENTION

Figure 1:
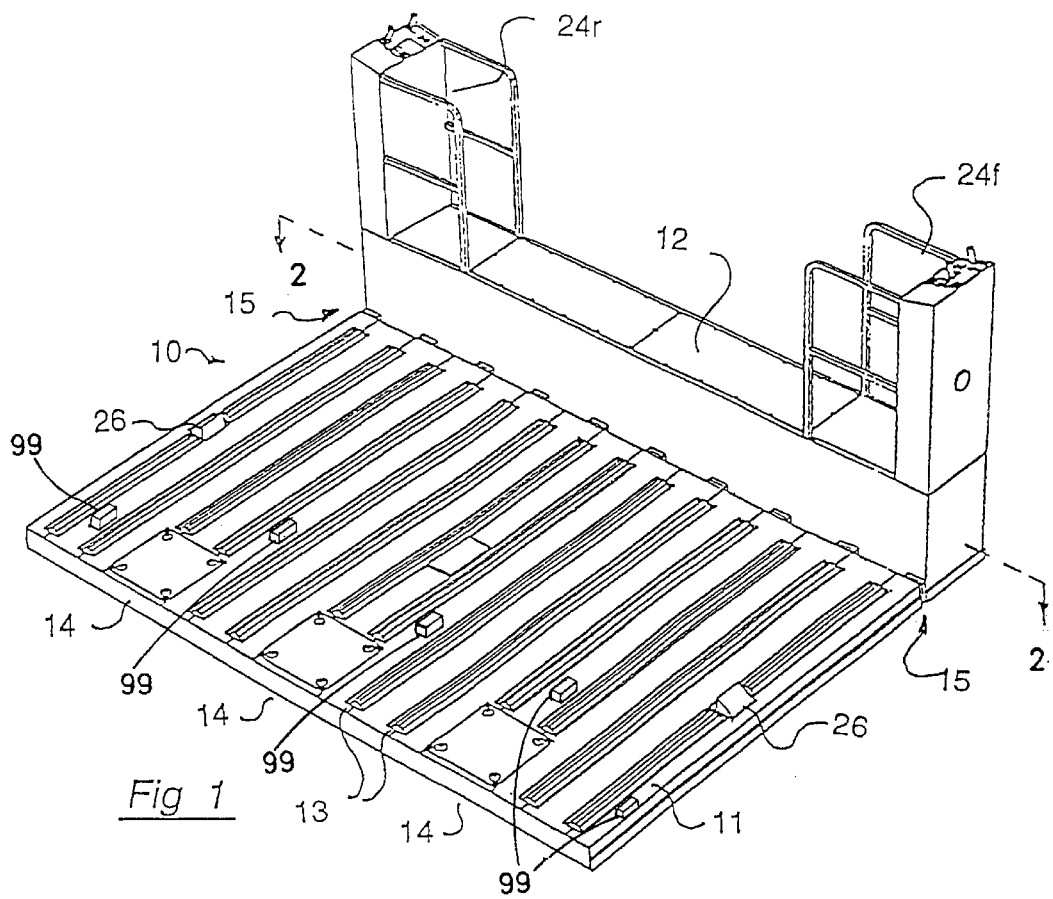
FIG. 1 is a perspective view of an airfreight transporter, according to a first embodiment of the invention.
Figure 2:
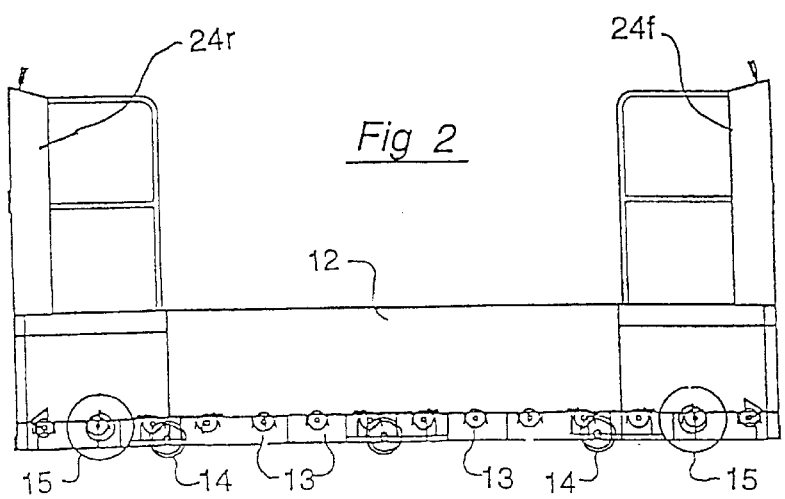
FIG. 2 is a side elevation of the transporter shown in FIG. 1.

In FIGS. 1 and 2, a transporter 10 is intended primarily for use in transporting standard containers or pallets at airport facilities or the like, but clearly has uses in other fields and for transporting other loads.

The transporter 10 comprises primarily a platform 11 for carrying the load, rigidly connected to a drive unit 12 which contains storage batteries, where the transporter 10 is electrically powered, or other suitable power source for example an internal combustion engine. The batteries or other power source are connected to drive a pressurised fluid pump, such as a hydraulic pump, which may be of fixed or variable output.

It is desirable for the platform 11 to be as low as possible and as the batteries or other power source are necessarily bulky they are contained within the drive unit 12 located along one edge of the platform 11. The upper surface of the platform 11 is provided with rollers 13 to facilitate loading and unloading of the load.

The platform 11 is typically supported by three or four free-running unpowered, castoring wheels 14 (only three shown) located along the edge of the platform 11 opposite the drive unit 12. If required, more castoring wheels 14 can be provided at other positions beneath the platform 11. The term "castoring wheel" herein is taken to mean a wheel which is free running about the transverse axis thereof and which is free to pivot, in a steering sense, about a king pin or other vertical axis positioned forward of said transverse axis. The transporter 10 is driven by a pair of powered wheels 15 located beneath the drive unit 12 and adjacent opposite ends thereof.

Figure 3:
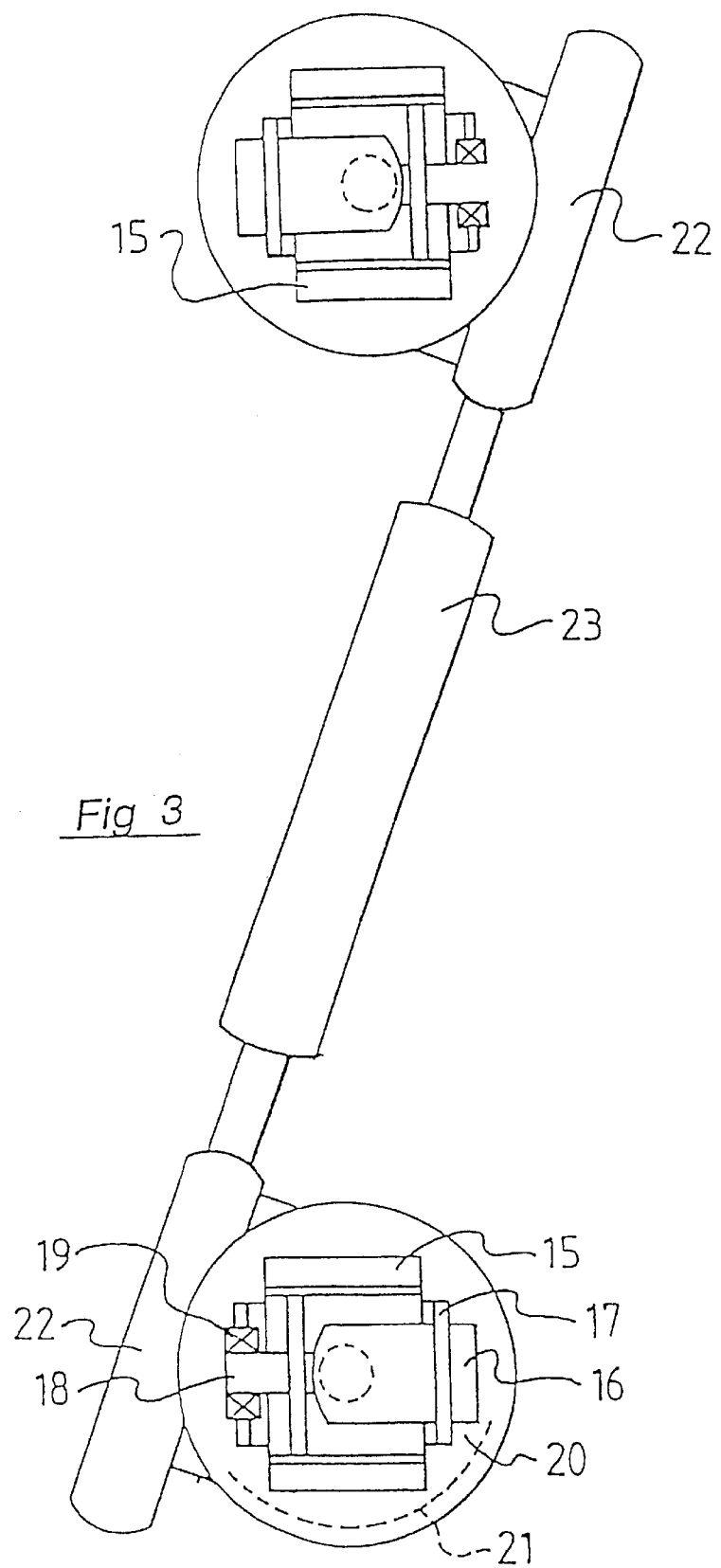
FIG. 3 is part section along the line A—A, in FIG. 1 in diagrammatic form and at enlarged scale, showing drive wheels and a steering mechanism.

As shown in FIG. 3, each wheel 15 is driven by a reversible hydraulic motor 16 mounted in one end of a stirrup 17 and protruding part way into the wheel 15. The wheel 15 is conveniently mounted on a spindle 18 carried by a bearing within the motor 16 and another rolling element bearing 19 mounted in the opposite end of the stirrup 17.

In another configuration, if the capacity of the bearings in the hydraulic motor 16 is sufficient to cope with all the loads imposed on the wheel 15, such as in a typical hydraulic-wheel motor, the wheel 15 may be mounted directly onto the shaft of said motor and the spindle 18 may be omitted.

Although the wheel 15 has been shown with a single solid tyre, a pair of solid tyres could be used instead, one at each end of the wheel 15.

A king pin 20 is fastened to, and extends vertically from the top of the stirrup 17 to a pinion 21 of a rack-and-pinion steering gear 22. The king pin 20 is mounted for rotation and load carrying by suitable bearings to the structure of the drive unit 12. As shown in FIG. 3 the steering gear 22 of each wheel 15 is interconnected by a double-ended, double-acting hydraulic ram 23, the protruding ends of the central shaft of which are each connected to one of the racks in the steering gears 22. Thus, when the ram 23 is operated it will cause one wheel 15 to rotate about the axis of the king pin 20 thereof in a clockwise direction, and the other wheel 15 to rotate about the axis of the king pin 20 thereof in an anti-clockwise direction or vice versa. The angular travel of each wheel 15 about the axis of the king pin 20 is preferably greater than 90 degrees and less than 180 degrees and is conveniently around 135 degrees, as shown diagrammatically in FIGS. 4 to 8.

If preferred, the racks of the steering gears 22 may be joined together by a rigid bar, which is moved by a double-acting, single ended ram 23 connected thereto and mounted to one side of and parallel to the bar.

Referring again to FIGS. 1 and 2, the transporter 10 is controlled from a pair of substantially identical control positions 24 (with subscripts "f" and "r" indicating front and rear), one at each end of the drive unit 12, whereby a driver can operate from whichever of the control positions 24 is most convenient and can walk along the top of the drive unit 12 therebetween. Each control position 24 includes a control for a valve means for controlling the flow of hydraulic fluid to and from the steering ram 23.

An interconnection is provided between the two control positions 24 such that two drivers cannot attempt to drive the transporter at the same time.

The steering control is preferably a joystick movable transversely from a central position by an amount proportional to the angular movement of the wheels 15 about the king pin axes. Similarly, a fore-and-aft joystick controls the flow of hydraulic fluid to the motors 16, so that they both drive forwards when the joystick is forward and vice versa, the central joystick position providing no drive to the wheel 15 in either direction. Braking of the wheel 15 may be obtained by a slight reversal of the fluid flow thereto.

FIGS. 4 to 8 show the steering effect on the transporter 10 of steering the wheels 15 through the available angle.

FIG. 6 shows a typical path 25 of the transporter 10, achieved by steering the wheels 15 on a continuously adjustable basis, similar to the steering procedure of a normal motor vehicle.

FIG. 7 shows the positions of the spindle 18 to achieve a fairly tight turn about a centre on the opposite side of the transporter from the drive unit 12.

FIG. 8 shows the spindles 18 at one end of their steering travel, to achieve a minimum radius turn about a centre outside the transporter 10 on the same side as the drive unit 12.

FIG. 4 shows a particular setting of the spindles 18, at the opposite ends of their travel from FIG. 8, in which the spindles 18 are aligned and in which the wheels 15 are powered to move the transporter 10 back or forth in a transverse path 25. In this case, since steering of the transporter 10 is not possible by moving the spindles 18, the transporter 10 is steered by differential driving or braking of the motors 16. For this mode, one of the wheels 15 is driven in the opposite direction to the other wheel 15 compared with normal operation.

FIG. 5 shows the setting of the spindles 18 to achieve rotation of the transporter 10 about the centre thereof. Instead of using the steering joystick to achieve the wheel positions for FIGS. 4 and 5, they are achieved by use of pre-set control buttons on the control positions 24 to bring the wheels 15 automatically to the correct positions.

Although the transporter 10 has been described as being driven by a driver carried thereon, for some purposes it may be preferred to control it from a remote position. This may be achieved, for example, by use of an umbilical cord or by an infra-red or radio link between a receiver on the transporter 10 and a transmitter operated by a remote driver.

Alternatively it could be controlled by a computer system and/or by a tracking system built into the floor or the like.

Alternatively, both steering control and traction or drive control may be performed manually. In the case of steering control, for example, a wheel or lever may be used to impart motion to a valve located at or near the steering ram 23. Pre-setting of the positions of the wheels 15 for the modes shown in FIGS. 4 or 5 could be by detents or by a lever gate system or the like.

Furthermore, where the pump supplying the pressurised fluid to the motors 16 is a variable output pump, such as a swash-plate type, the pump output can be controlled by a direct mechanical or other connection from the relevant hand control to the pump.

With regards to the design and operation of the platform 11, some or all of the rollers 13 may be power driven, for example, by reversible electric motors. Other rollers 13 may be free running. The length of the platform 11 is preferably slightly in excess of the length of one standard airfreight unit.

Proximity switches 99 or similar load detectors may be provided at positions along the platform 11, preferably at each end thereof, at the center and one quarter and three quarters of the distance along. By this means, a single container being moved onto the platform 11 can be moved forward by the powered rollers until it reaches the far end proximity switch which then turns off the powered rollers in the front half of the platform 11. A second container can then be moved forward up to the first container when the center proximity switch will turn off the powered rollers on the rear half of the platform 11. Where a single container is to be carried in the center of the platform 11 for stability purposes, the proximity switch at the three quarters distance from the rear of the platform 11 will turn off the powered rollers when the container reaches that point, so that the container is located in the center half of the platform 11.

By means of an alternative disposition and use of proximity switches or the like, a versatile method of loading different shaped or sized loads may be achieved and in some circumstances only a single drive motor may be adequate for driving all the powered rollers 13.

In this embodiment four proximity switches are provided, a first and fourth being near the opposite ends of the platform 11 and the second and third at intermediate positions, preferably symmetrically spaced from the centre of the platform 11 between the first and fourth proximity switches. The distance between the second and third is slightly greater than the length of a single container. Thus, as a half-length container moves onto the platform 11, it covers the first proximity switch and turns on all the powered rollers. Thereby, the container is moved along the platform until the first switch is cleared. However, by that time the container is over the second switch, since the distance between the first and second switches is less than the length of the half-length container. The second switch keeps the powered rollers driving until the container clears the second switch. The rollers are thus switched off, since the container will not have reached the third switch. Thereby, the container will be parked in the center of the platform 11.

If it is required to carry two half-length containers, the second and third switches are moved towards each other, near to the center of the platform 11. When the first container is moved onto the platform 11, it activates the first switch to power the rollers and draw the container along until it clears the first switch, but has not reached the second switch so the rollers are switched off. When the second container is moved onto the platform, it activates the first switch to power the rollers. This moves the first container along and draws the second container onto the platform until, substantially simultaneously, the first container clears the third switch but has not reached the fourth switch and the second container clears the first switch but has not reached the second switch, the rollers are thereby switched off and both containers are parked approximately symmetrically about the longitudinal centre of the platform.

As shown in FIG. 1 a safety stop 26 can be provided at each end of the platform 11 to be moved into a raised position before the transporter 10 is driven away, to prevent any load thereon from moving off the platform 11 during acceleration or braking.

Figure 9:
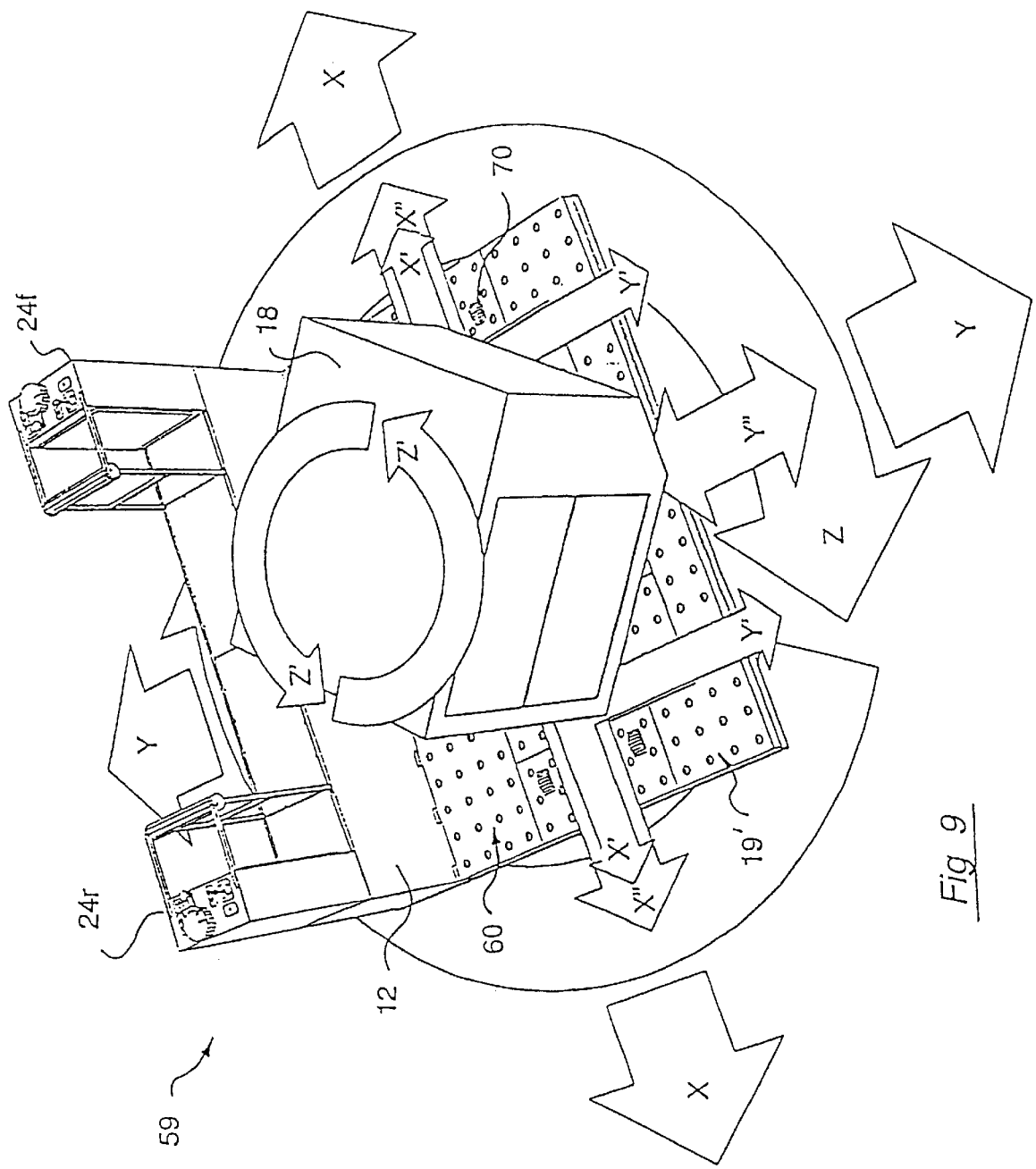
FIG. 9 is a schematic perspective view of an airfreight transporter according to a second embodiment of the present invention.
Figure 10:
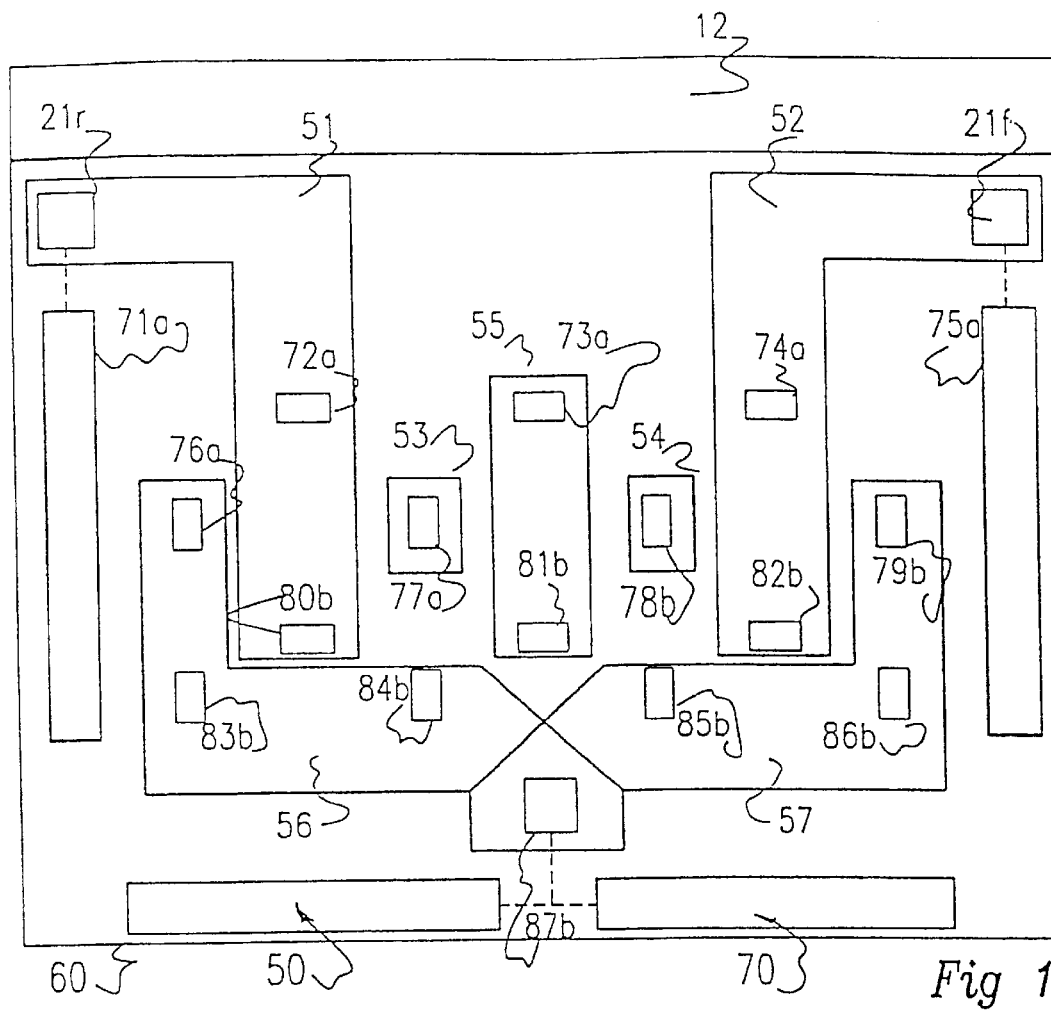
FIG. 10 is a schematic diagram of the deck of the transporter of FIG. 9.

FIGS. 9 and 10 show details of a wheeled transporter 59 according to a second embodiment of the present invention. This wheeled transporter 59 has a similar drive unit and platform support and drive system, to the first embodiment and similar components are thus indicated by the same symbols and description is omitted. Movement of the transporter 59 of FIG. 9 is indicated by arrows X, Y, Z. Operation of the proximity switches is similar to that of the first embodiment with additional switches for control of transverse movement located adjacent to the drive unit 12 to prevent contact of containers with the drive unit 12. Moreover due to compact design of the platform, a time delay function is provided for the first and fourth proximity switches which are positioned to lie inside the peripheral edges of a full length container, so that full length containers can be correctly centered on the platform. In addition the second and third proximity switches may be in two sets which can be selectively switched as required.

A feature of this embodiment is a deck generally indicated by arrow 60, comprising a plurality of powered rollers generally indicated by arrow 70 drivable in forward and reverse directions. The rollers 70 are mounted on the deck 60 by means of hydraulically operated ramsets generally indicated by arrow 50 (FIG. 10) whereby the rollers 70 may be raised or lowered, and are arranged in groups such that a container 18 supported on the deck 60 may be moved in longitudinal and transverse directions as shown by arrows X', Y' and X", Y" and rotated about a vertical axis as shown by arrows Z', by raising and powering appropriate rollers in the groups In FIG. 9 the smaller arrows X', Y', Z' indicate movement of the half container 18 as shown, while the larger arrows X", Y" indicate movement of any length container or pallet.

The deck 60 is also provided with low friction support means such as a plurality of omnidirectional roller balls 19', for providing a low friction support for the container as it is moved relative to the platform.

Operation of the deck 60 will now be described with reference to FIGS. 10 and 11. Movement directions in FIG. 10 are referred to in relation to the drive unit 12, with longitudinal movement being in a plane parallel to the longitudinal plane of the drive unit 12(left/right direction in FIG. 10), and transverse movement being in a plane perpendicular to this (up/down direction in FIG. 10). As shown in FIG. 10 the ramsets 50 are in seven ramset groups, namely ramsets 51 through 57. These ramsets 50 are for raising corresponding rollers 70, which are rotatable by independent hydraulic circuits A, and B to be described later. Rollers powered by circuit A are designated by subscript "a", while those powered by circuit B are designated by subscript "b".

Ramset 51 is for raising rear end (left-hand end in FIG. 10) longitudinal drive rollers 71*a*, 72*a*, 80*b*, drive roller 71*a* being a rear edge long roller (with drive represented by the broken line) and drive rollers 72*a*, 80*b* being short rollers. Similarly ramset 52 is for raising front end (right-hand end in FIG. 10) longitudinal drive rollers 75*a*, 74*a*, 82*b*, drive roller 75*a* being a front edge long roller (with drive represented by the broken line), and drive rollers 74*a*, 82*b* being short rollers. Ramsets 53 and 54 are for raising respective rear and front inner (towards the deck center) transverse drive rollers 77*a*, 78*b*. Ramset 55 is for raising a pair of inner longitudinal drive rollers 73*a*, 81*b*. Ramset 56 is for raising a pair of rear outer (towards the deck edge) transverse drive rollers 76*a*, 83*b* and a rear inner transverse drive roller 84*b*, substantially in line with roller 77*a*. Similarly ramset 57 is for raising a pair of front outer transverse drive rollers 79*b*, 86*b* and a front inner transverse drive roller 85*b*, substantially in line with roller 78*b*. Ramsets 56 and 57 also share a roller 87*b* (with drive represented by the broken lines). This roller 87*b* is only raising when both ramsets 56 and 57 are extended.

When the deck 60 is not being used to move a container, the ramsets 50 are normally up so that the rollers 70 contact the base of the container being supported on the deck 60, and thus hold the container in position. The ramsets 50 are retracted as follows to achieve the following functions, with drive rollers 70 of the sets which remain extended, being driven in either direction by their respective hydraulic circuits A and B as required:

| Function | Retract sets | Sets extended |
|---|---|---|
| Rotate unit | 51, 52, 56, 57 | 53, 54, 55 |
| Full Deck longitudinal | 53, 54, 56, 57 | 51, 52, 55 |
| Full deck transverse | 51, 52, 55 | 53, 54, 56, 57 |
| Rear deck longitudinal | 52, 53, 54, 56, 57 | 51, 55 |
| Front deck longitudinal | 51, 53, 54, 56, 57 | 52, 55 |
| Rear deck transverse | 51, 52, 55, 57 | 53, 54, 56 |
| Front deck transverse | 51, 52, 55, 56 | 53, 54, 57 |

Figure 11:
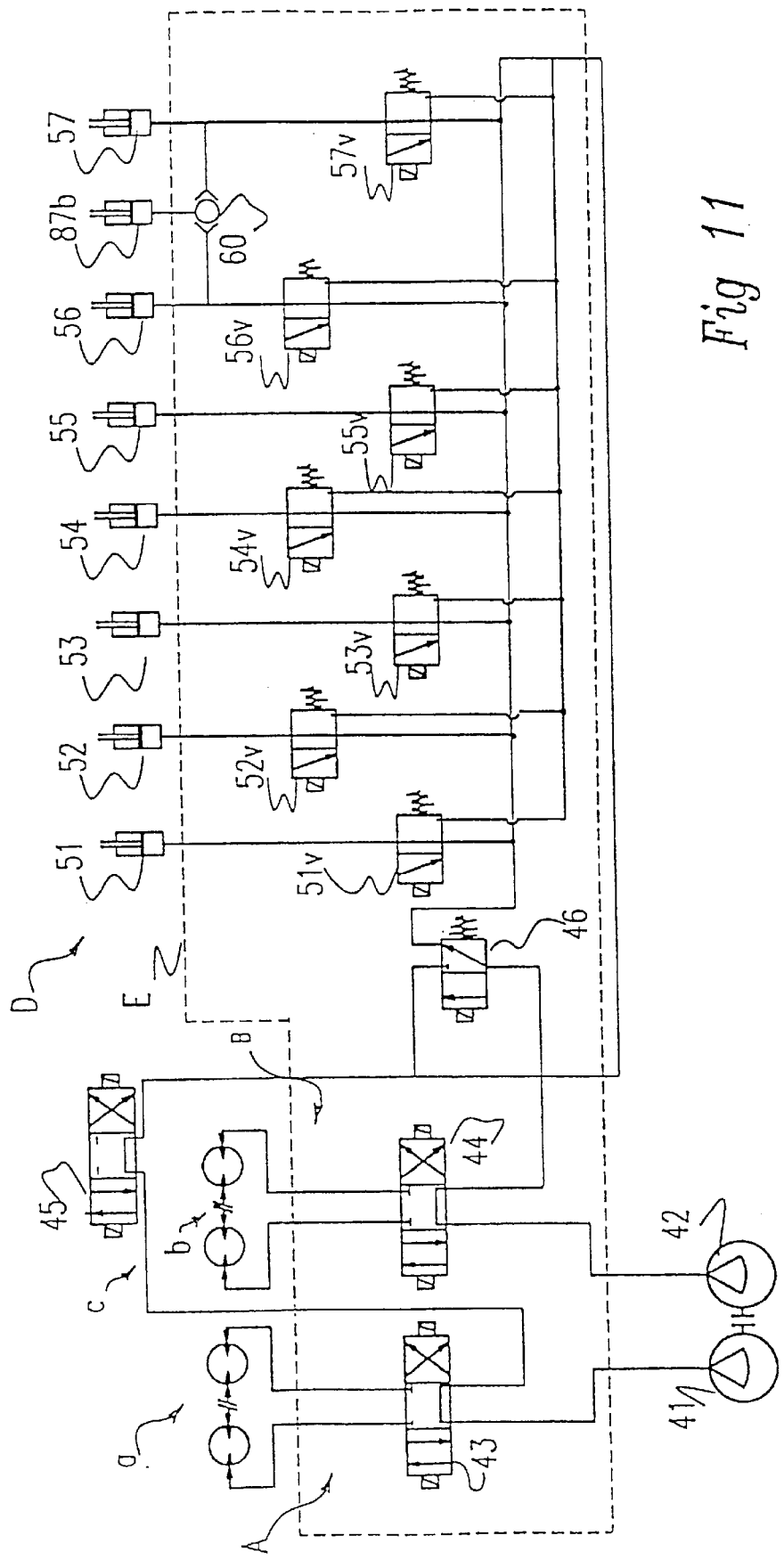
FIG. 11 shows a hydraulic circuit for the deck of FIG. 10.

Details of the deck hydraulic circuit for operating the ramsets 50, powering the rollers 70, and also for operating the steering are shown in FIG. 11.

As shown in FIG. 11, the deck hydraulic circuit incorporates two tandem fixed displacement pumps 41, 42, driven by a single prime mover, for providing power to drive roller hydraulic circuits A, and B, to a steering circuit C and to a ramset circuit D via a hydraulic valve manifold E (indicated by a dotted outline).

The pumps 41, 42 are respectively connected via double solenoid valves 43, 44 to drive roller motor set "a" (comprising 7 motors) and drive roller motor set "b" (comprising 10 motors). Motor set "a" powers rollers 71a, 72a, 73a, 74a, 75a, 76a, 77a, while motor set "b" powers roller 78b, 79b, 80b, 81b, 82b, 83b, 84b, 85b, 86b, and roller 87b. Operation of the rollers 70 in either direction is achieved by switching the valves 43, 44 between forward and reverse modes as required.

Pump 42 also provides power to the hydraulic circuit D or operating the ramsets 50 to raise and lower the rollers 70. It is connected via a two position spool valve 46 to ramset 51 (four rams), ramset 52 (four rams), ramset 53 (one ram), ramset 54 (one ram), ramset 55 (two rams), ramset 56 (three rams), and ramset 57 (three rams) via ramset control valves 51v, 52v, 53v, 54v, 55v, 56v, and 57v respectively. The roller 87b is arranged common to ramsets 56 and 57 via a shuttle valve 60, so as to be only raised when both ramset 56 and ramset 57 are extended.

Pump 41 also provides power to the steering circuit C for the operation of steering hydraulics to be described later, via a steering servo valve 45.

The various valves of the hydraulic circuits of FIG. 11 can be independently controlled by means of switching circuits separately provided in control panels in each of the front and rear control positions 24f, and 24r, interlocked to ensure that operation can only be made from one control position at a time. The switching circuits comprise standard control circuits operated by control buttons on a control panel to appropriately control the valves 51v through 57v to retract and extend the ramsets 50 according to the schedule in the above table, and control the valves 43, 44 to rotate the rollers 70 in the appropriate direction. A container can thus be loaded onto and off the deck 60 and positioned and rotated on the deck 60 as required.

Figure 12:
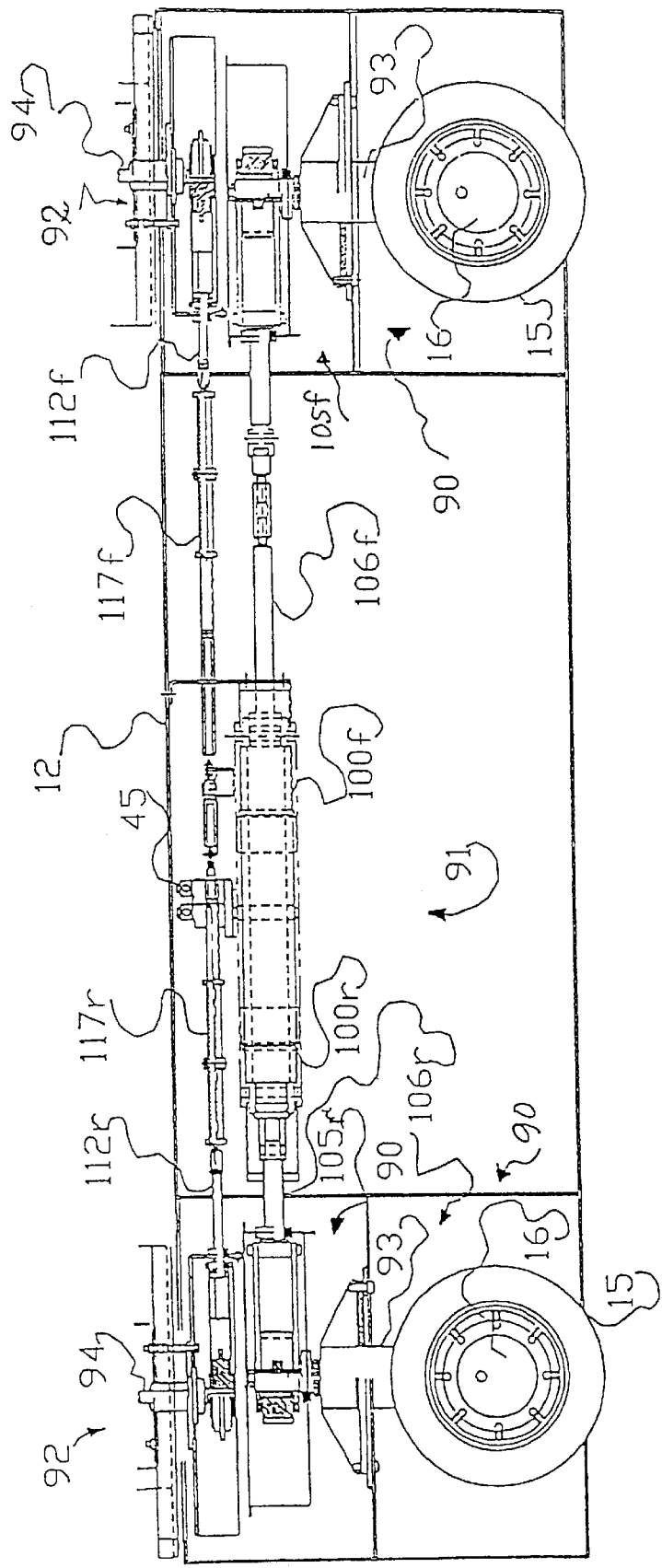
FIG. 12 is an elevation view of a steering mechanism according to another aspect of the invention.
Figure 13:
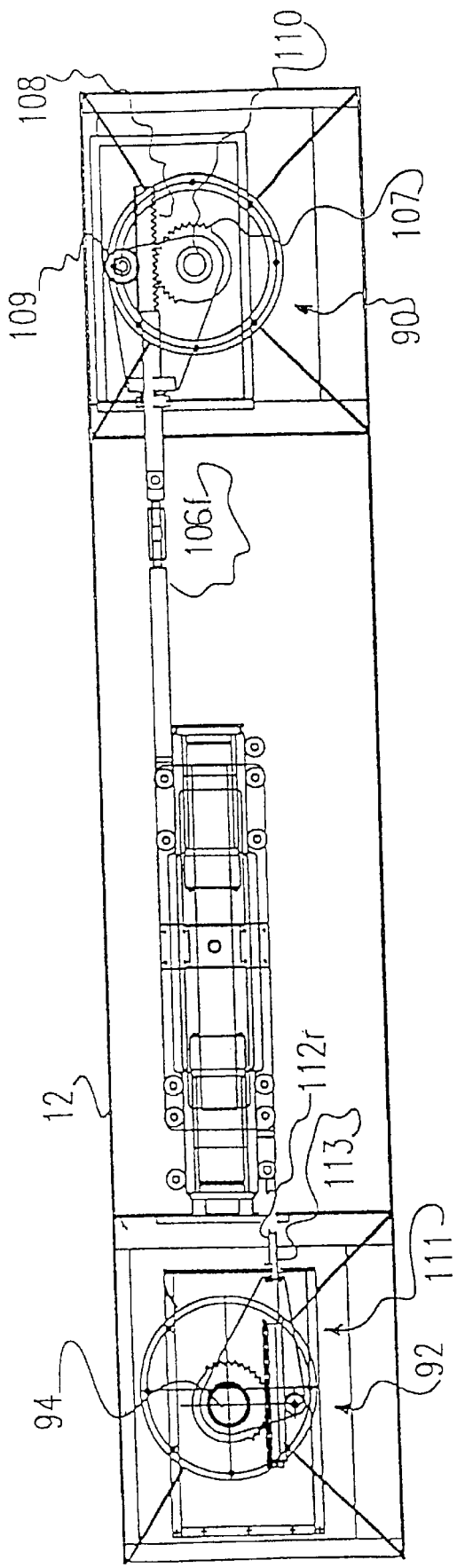
FIG. 13 is a part cutaway plan view of the steering mechanism of FIG. 12.
Figure 14:
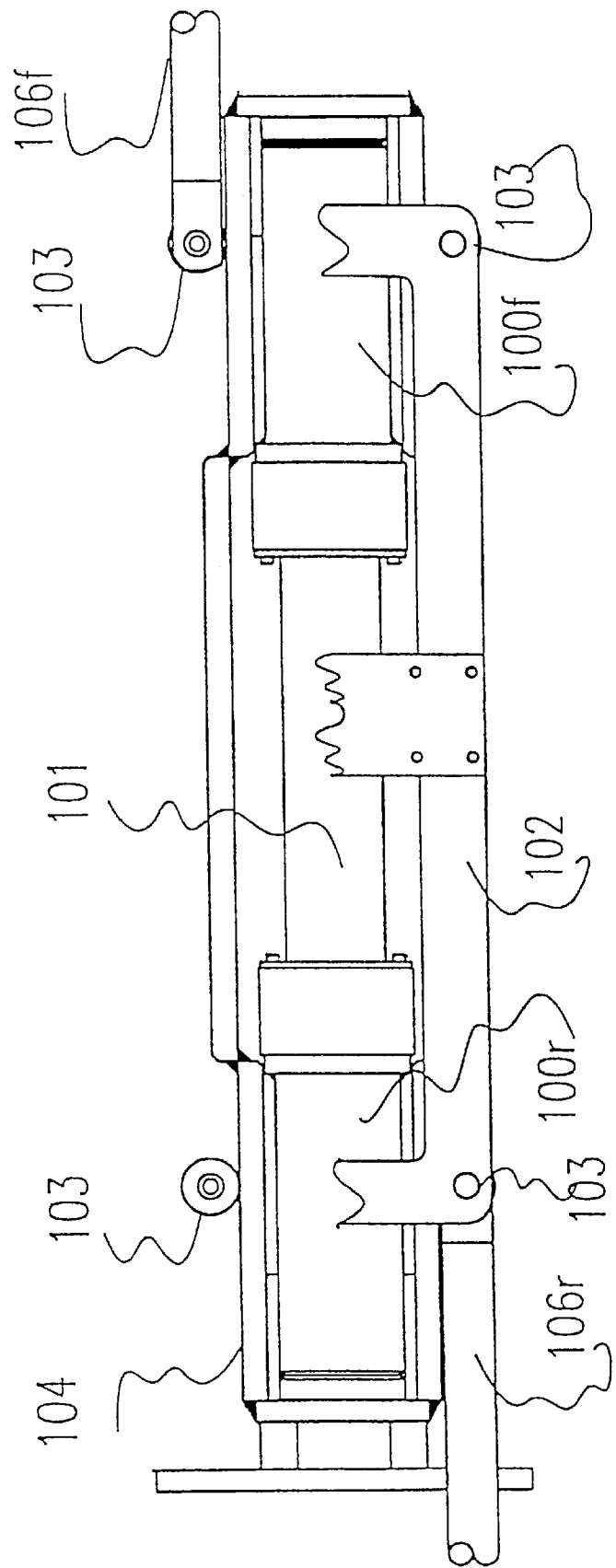
FIG. 14 is a schematic diagram showing details of an hydraulic actuator assembly.
Figure 15:
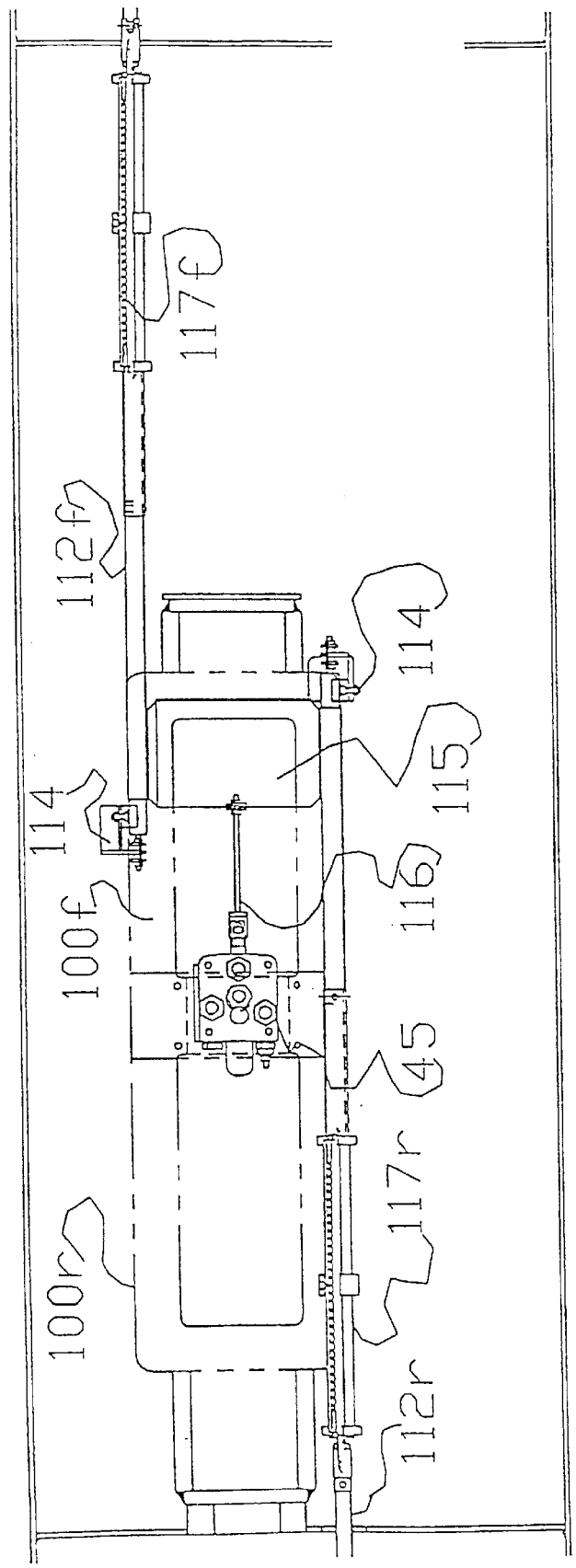
FIG. 15 is an enlarged view of part of the servo drive mechanism shown in FIG. 13.

An embodiment of a servo steering system for the transporter of the abovementioned embodiments will now be described with reference to FIG. 12 to 15. FIG. 12 is an elevation view of a general layout of the steering system showing rack and pinion wheel steering assemblies 90, while FIG. 13 is a part cut away plan view, showing details of the wheel steering assembly 90 on the right-hand side, and details of the servo drive mechanism 92 on the left-hand side. FIG. 14 shows details of the hydraulic actuator assembly 91, while FIG. 15 shows the arrangement of the servo valve 45 for the servo drive mechanism 92.

The wheel steering assembly 90 is provided for each of the wheels 15 (front and rear) in a similar arrangement to that of FIG. 3, while the servo drive mechanism 92 provides feedback control from each wheel steering assembly 90, to give assisted and accurate steering control.

As shown in FIG. 14, the wheel steering assembly 90 is operated by two single acting hydraulic steering rams 100f, 100r with a single piston rod 101. A moving saddle 102 is fixedly connected to the piston rod 101 and movable therewith under guidance of rollers 103 moving along a fixed frame 104. The fixed frame 104 mounts the steering rams 100 on a structure of the drive unit 12. The piston rod 101 is connected to front and rear rack and pinion units 105f, 105r by means of connecting rods 106f, 106r, connected to opposite side ends of the saddle 102.

Returning to FIGS. 12 and 13, each of the rack and pinion units 105f, 105r comprises a pinion 107 and a rack 108 which is moved between the pinion 107 and a roller 109 with operation of the rams 100, to thereby rotate wheel steering shafts 110 which are rotatably mounted to the structure of the drive unit 12 by means of bearing units 93.

As can be seen in FIG. 12, the wheels 15 in this embodiment are mounted together with hydraulic motors 16, on the steering shafts 110 with a central vertical plane of the wheel 15 displaced by a predetermined amount from the axis of the steering shaft 110. This has the effect of reducing loadings on the steering members during turning.

The servo drive mechanism 92 provides servo control of the steering rams 100. It comprises the servo valve 45 (FIG. 11) which is mounted on the saddle 102 (FIG. 14) and thus moves therewith. The servo valve 45 controls hydraulic flow to the rams 100. The servo valve 45 is linked to steering columns 94 provided with a control lever 310 (see FIG. 22) at each control position 24f, 24r by means of a servo linkage, and a chain and sprocket drive 111 similar to the rack and pinion units 101 but with a chain and sprocket instead of a rack and pinion. As shown more clearly in FIG. 15, the servo linkage involves feedback link rods 112f, 112r, each connected at one end 113 to the chain sprocket drives 111, and at the other end 114 to opposite sides of a slide member 115 which is mounted on tracks on the saddle 102 (FIG. 14) so as to be slidable relative thereto. The slide member 115 is connected by a valve rod 116 to the servo valve 45. The link rods 112f, 112r are selectively connected to drive the slide member 115 by means of slip links 117r, 117f, which function in a similar manner to slip links 163, 164 described later with reference to FIG. 14.

To operate the steering, the steering column 94 of the control position 24 which is being used (ie. for which the slip link 117 is locked) is turned so that the valve rod 116 is moved in the respective direction so that the servo valve 45 opens to supply hydraulic pressure to the respective ram 100. The piston rod 101 is thus moved to drive the rack and pinion 101 and thus turn the steering column 94. With movement of the piston rod 101, the servo valve 45 which is mounted on the saddle 102 also moves so that the valve rod 116 returns to the original position relative to the body of the servo valve 45 thus shutting off the hydraulic pressure supply. With the present embodiment, the pitch circle diameter for the rack and pinion units 101 is the same as that for the chain and sprocket drives 111, so that the wheels 15 are turned in opposite directions in direct proportion to the amount of turning of the control lever 310 (FIG. 18) connected to the steering column 94.

An embodiment of a traction drive system and a drive control system for the transporter of the above embodiments will now be described, with reference to FIG. 16 through FIG. 21. In the description components similar to those in the beforementioned embodiments are denoted by the same symbol and description is omitted.

Figure 16:
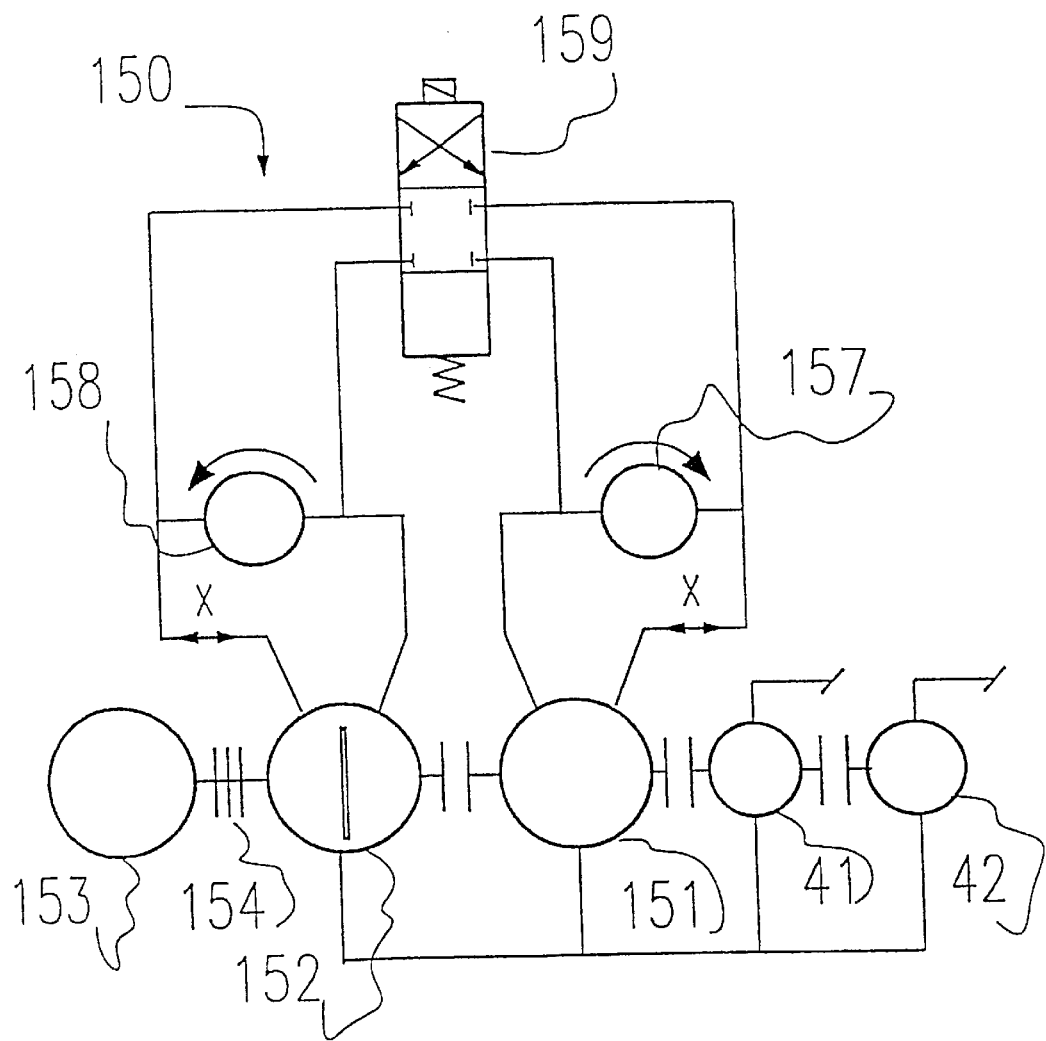
FIG. 16 is schematic diagram showing details of a hydraulic traction drive system.

FIG. 16 shows details of a hydraulic propulsion system 150 of the traction drive system for powering the drive wheels 15 of the transporter 10, 59. The propulsion system 150 comprises two variable displacement swash plate type hydraulic pumps 151, 152 driven by a prime mover 153 (for example an internal combustion engine or an electric motor, also used to drive the fixed displacement pumps 41, 42 of FIG. 11) through a flexible coupling 154. The pumps 151, and 152 are housed together with the prime mover 153 in the drive unit 12 of the transporter 10, 59, and are each individually controlled by means of a swash plate control lever 155, 156 (see FIGS. 17, 18) to provide hydraulic fluid supply in either direction as shown by arrows X, X and of varying flow rate, depending on the angle of the swash plate. Pump 151 is connected to a front wheel hydraulic motor 157 which corresponds to one of the hydraulic motors 16 of FIG. 3 or FIG. 12, while hydraulic pump 152 is connected to a rear wheel hydraulic motor 158 which corresponds to the other of the hydraulic motors 16 of FIG. 3 or FIG. 12. The motors 157, 158 can thus be driven in either direction and at variable speeds by appropriate control of the respective swash plate control levers 155, 156.

The propulsion system also includes a stationary steering bypass system having a bypass valve 159, which enables the hydraulic motors 157, 158 to be turned together in opposite directions when turning the steering while stationary. This helps to reduces scuffing loads on the tyres due to the central vertical plane of the wheels 15 being displaced by a predetermined amount from the axis of the steering shaft 110 as mentioned before with reference to FIG. 12. The bypass valve 159 is opened when the steering column 94 is turned with the swash plates in a parallel or zero delivery condition, thus allowing hydraulic fluid to pass from one hydraulic motor to the other in a closed loop so that the motors can be turned together in opposite directions.

The drive control system for the pumps 151, 152 will now be described with reference to FIG. 17 through FIG. 21.

Figure 17:
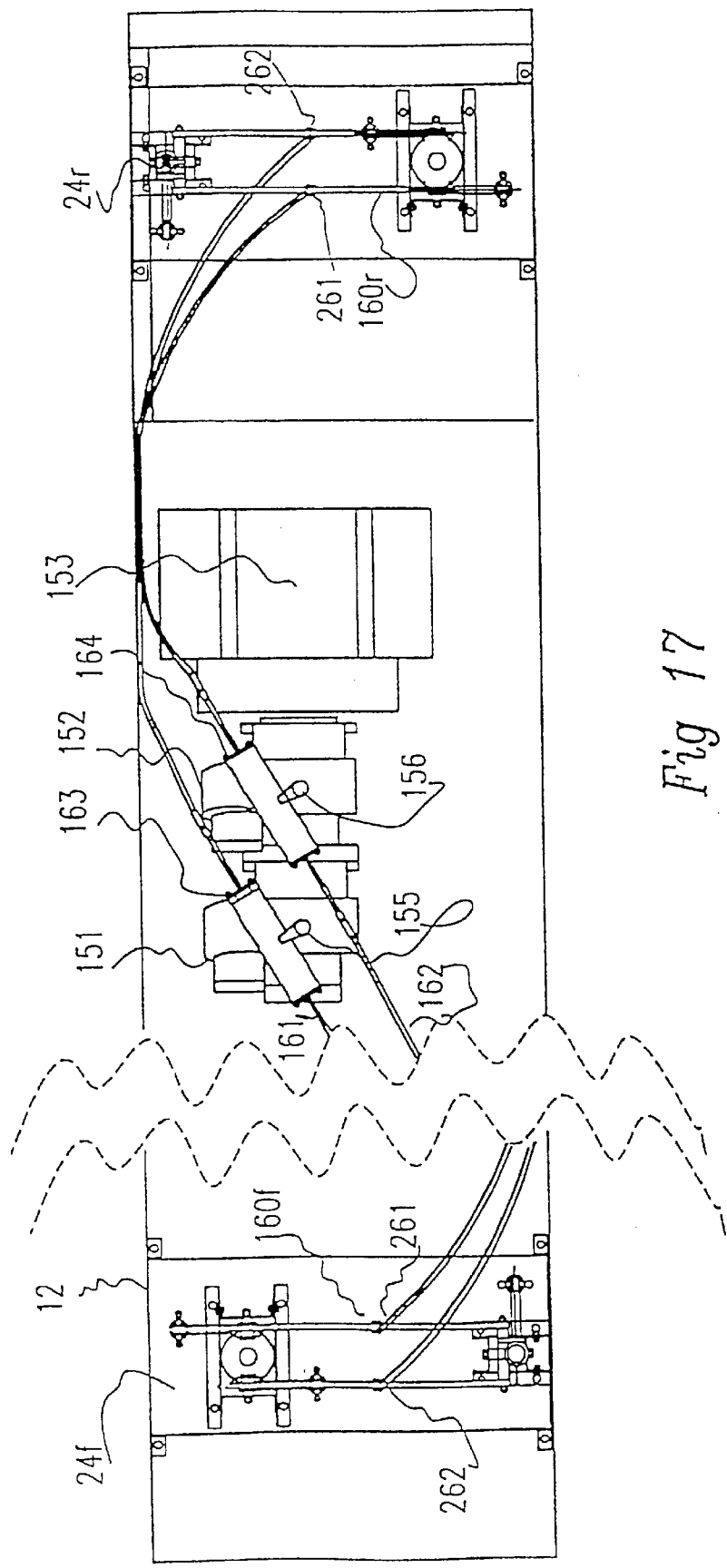
FIG. 17 shows an arrangement of the elements of a two console speed control system for the traction drive system of FIG. 16.

FIG. 17 shows the arrangement of the pumps 151, 152 and prime mover 153 mounted in the drive unit 12 with control positions 24f, 24r at each end. Separate control mechanisms 160f, 160r for the pumps 151, 152 are provided at each control position 24f, 24r, and are connected to the swash plate control levers 155, 156 of the pumps 151, 152 by means of respective push-pull cables 161, 162, through respective double ended slip links 163, 164.

Figure 18:
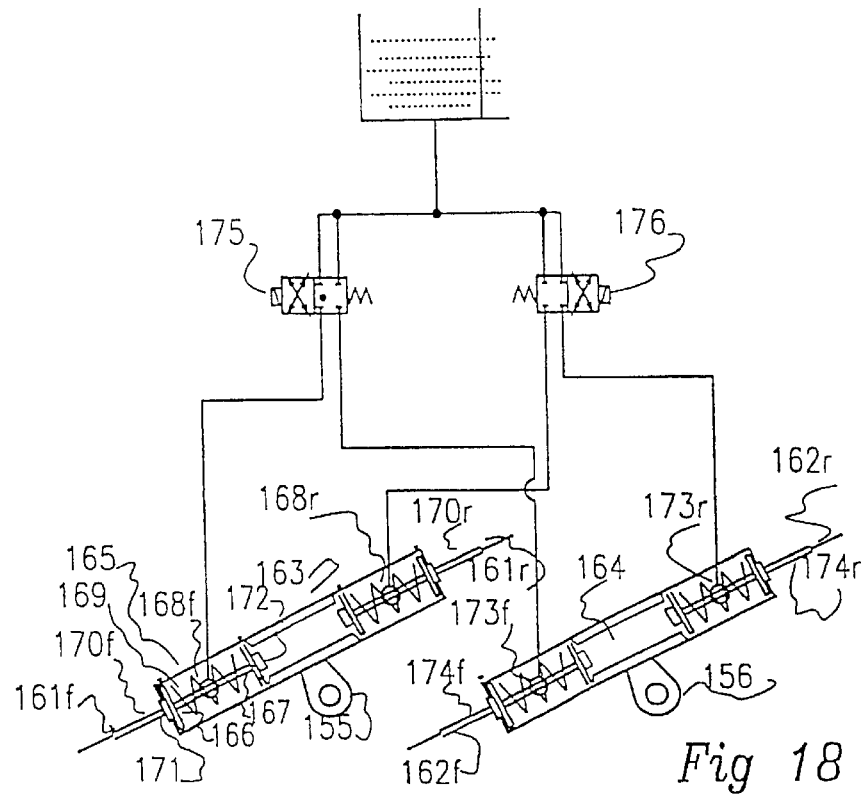
FIG. 18 is a schematic diagram showing a double ended slip link hydraulic circuit used for isolating operation from respective consoles of the system of FIG. 17.

The double ended slip links 163, 164 are arranged in a hydraulic circuit as shown in FIG. 18, and are operated to positively connect one or other of the push-pull cables 161, 162 to the swash plate control lever by means of a hydraulic lock (for example push-pull cable 161f or 161r to the control lever 155). This is achieved by opening or closing solenoid operated valves 175, 176 respectively provided at control positions 24f and 24r, to open or close off hydraulic flow to front or rear cylinders of the respective double ended slip links 163, 164.

Construction and operation of the double ended slip links 163, 164 will now be described with reference to FIG. 18.

Each of the double ended slip links 163, 164 comprises two identical slip links made up of a cylinder member 165 and two pistons 166, 167 slidable within a bore thereof, and an aperture 168 formed in a wall of the bore between the pistons 166, 167. A spring 169 is provided between the pistons 166, 167 for biasing the pistons 166, 167 towards opposite ends of the bore. An actuating rod 170 of the slip link passes through apertures in the pistons 166, 167 with sliding seals fitted so as to provide a fluid tight seal. Location stops 171, 172 are fixedly attached to the actuating rod 170 at opposite ends thereof so that the pistons 166, 167 can be pushed in either direction with movement of the actuating rod 170 in either direction, piston 166 being moved in one direction against the spring 169 by locations stop 171, and piston 167 being moved in an opposite direction against the spring 169 by location stop 172.

With the ports 168f of slip link 163, and 173f of slip link 164 closed and ports 168r, 173r open, actuating rods 170f of slip link 163 and 174f of slip link 164 are locked relative to the respective slip links 163, 164 while actuating rods 170r, 174r are unlocked so that the pistons can move in the cylinders under the spring force only. Hence in this condition the pumps 151, 152 can be operated with operation of the front push-pull cables 161f, 162f connected to the actuating rods 170f, 174f. On the other hand, with ports 168f, and 173f open and ports 168r, 173r closed, actuating rods 170f, 174f are unlocked relative to the slip links 163, 164, while actuating rods 170r, 174r are locked so that the pumps 151, 152 can be operated with operation of the rear push-pull cables 161r, 162r connected to the actuating rods 170r, 174r.

Figure 20:
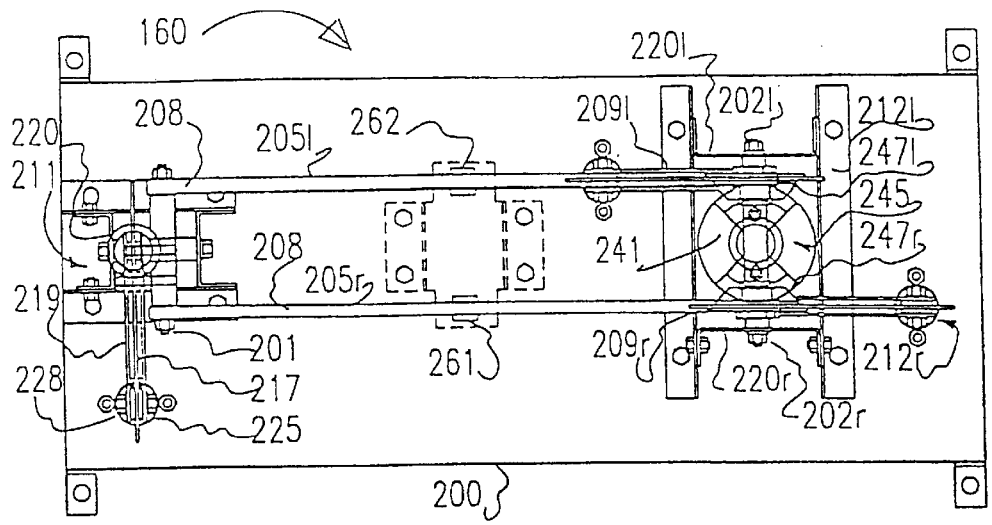
FIG. 20 is a plan view of the control mechanism of FIG. 19.

The control mechanisms 160f, 160r for operating the swash plate control levers 155, 156 via the push-pull cables 161, 162 will now be described with reference to FIGS. 19 to 21. The control mechanisms 160f and 160r are identical and hence only one control mechanism 160 will be described. Moreover in FIGS. 19 and 20, similar components having left or right locations relative to the centreline of the control mechanism 160 are indicated by subscripts "l" and "r".

The control mechanism 160 comprises a base frame 200, a first pivot mount 201 and two second pivot mounts 202l, 202r all being movably located relative to the base frame 200, and first and second link arms 205l, 205r each pivotally and respectively mounted at first and second ends 208, 209l, 209r to the first pivot mount 201 and the second pivot mounts 202l, 202r. The first pivot mount 201 is movably located relative to the base frame 200 by means of a first actuating linkage 211, while the second pivot mounts 202l, 202r are movably located relative to the base frame 200 by means of two second actuating linkages 212l and 212r.

Figure 19:
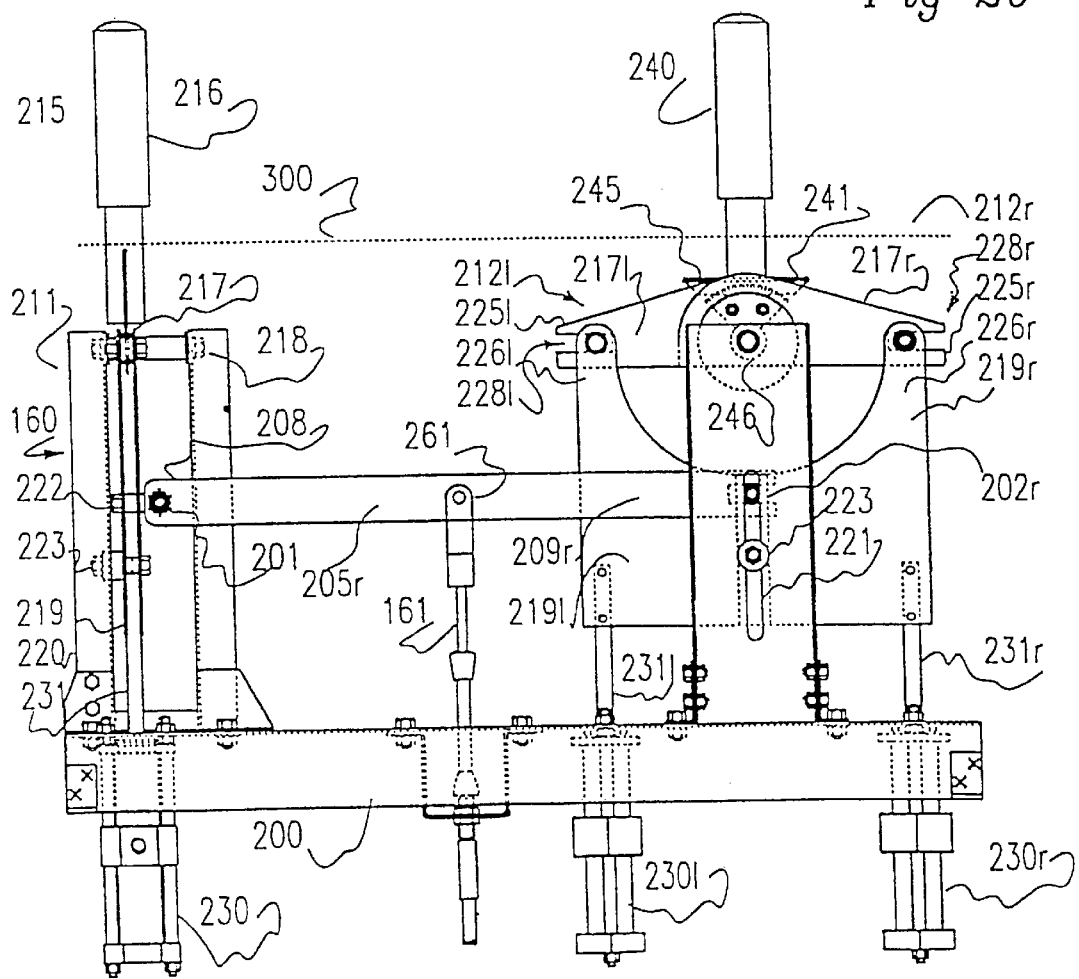
FIG. 19 is an elevation view illustrating an embodiment of a control mechanism according of the invention.

The first actuating linkage 211 and the second actuating linkages 2121l, 212r have similar constructions, and where details of the first actuating linkage 211 are not shown in the elevation view in FIG. 19, these details can be determined from similar components of the second actuating linkages 212 indicated with the same numeral.

The first actuating linkage 211 comprises a lever 215 having a joystick 216 and a link arm 217 fixedly connected thereto, pivotally mounted relative to the base frame 200 by means of a pivot pin 218. The link arm 217 of the lever 215 is connected to the first pivot mount 208 by means of a flag member 219 in the form of two identical plates of inverted flag shape. The flag member 219 is mounted on the base frame 200 by means of an upright channel 220 in which is formed a vertical slot 221 which locates a slide member 222 of the pivot mount 208, and an alignment pin 223 for aligning the flag member 219. The pivot mount 208 and the flag member 219 are thus guided to move in a vertical direction by the slot 221. The link attachment arm 217 is connected at an outer end 225 to a tip end 226 of the flag member 219 by means of a slot and a pin connection 228, whereby the flag plate 219 can be moved in a vertical direction while the arm 217 pivots about the pivot point 218.

Also provided is a positioning device in the form of a hydraulically locked dashpot 230 (to be described later with reference to FIG. 21) mounted on the base frame 200, and fixedly connected by means of an actuating rod 231 to a lower corner of the flag plate 219 vertically aligned with the slot and pin connection 228. The dashpot 230 provides a means for locking or allowing movement of the flag plate 209 relative to the base frame 200.

With this arrangement for the first actuating linkage 211, the first pivot mount 208 can be moved relative to the base frame 200 by pivotal movement of the joystick 216 about the pivot pin 218. Moreover, the first pivot mount 208 may be locked relative to the base frame 200 by locking the dashpot 230.

The second actuating linkages 212l and 212r are essentially a combination of two first actuating linkages 211, but with a single joystick/twistgrip 240 connected to the link arms 217l, 217r by means of a bevel gear drive 245, instead of being fixedly connected to the link arm 217 as with the first actuating linkage 211. More specifically, the joystick/twistgrip 240 is pivotally mounted relative to the base frame 200 at a base end by means of a pivot pin 246 which also acts as the pivot pin 218 for pivotal mounting of the link arms 217l, 217r, and is also rotatably mounted about its axis relative to the pivot pin 246. The bevel gear drive 245 comprises a transverse bevel gear 241 fixedly attached to the joystick/twistgrip 240, which is engaged with vertical bevel gear quadrants 247l, 247r respectively fixed to the left and right link arms 217l, 217r. Since other components are similar to those of the first actuating linkage, these are indicated with the same symbols and description is omitted.

As with the first actuating linkage there is also provided a hydraulically locked dashpot 230 for each of the second actuating linkages 212l and 212r similarly mounted and connected.

With this arrangement for the second actuating linkages 212l, and 212r, the two second pivot mounts 202l, 202r can be moved relative to the base frame 200 by pivotal movement of the joystick/twistgrip 240 about the pivot pin 246 to move the flag plates 219l, 219r. In this case however since the link arms 217l, 217r are on opposite sides of the pivot pin 246, then when one of the pivot mounts 202 is moved upwards, the other is moved in an opposite direction in direct inverse proportion. Moreover, with rotation of the joystick/twistgrip 240 about its axis (twist grip control), the bevel gear quadrants 247l, 247r are driven by the bevel gear 241 so that the link arms 217l, 217r pivot in opposite directions about the pivot pin 246. As a result the pivot mounts 202l, 202r can be moved in variable proportion relative to each other.

The first and second link arms 205l, 205r are respectively provided at a central portion thereof with link attachment points 261, 262. A shown in FIG. 17, link attachment point 261 is connected to push-pull cable 161, while link attachment point 262 is connected to push-pull cable 162.

To operate the control mechanisms 160 and thus control the output from the hydraulic pumps 151, 152, the link arms 205 are pivoted about one or other end depending on the required mode of operation. This requires that the relevant pivot point at that end is locked by means of the dashpot 230.

Figure 21:
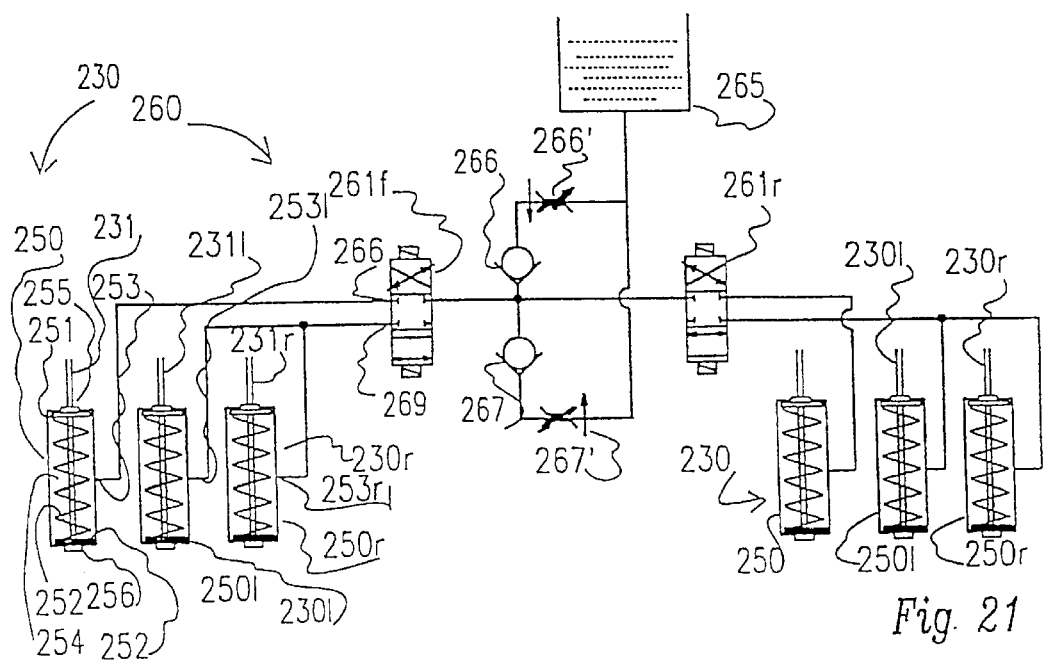
FIG. 21 is a schematic diagram showing a configuration of dash pots used in the control mechanism of FIGS. 19 and 20.

Details of the hydraulic locking dashpots 230 and their operating circuits are given in FIG. 21.

The dashpots 230 are all of similar construction, and are of similar design and operation to the individual slip links described beforehand with reference to FIG. 18. Hence repeated description is omitted, suffice to say that cylinder 250 corresponds to cylinder 165, pistons 251, 252 correspond to pistons 166,167, spring 254 corresponds to spring 169, actuating rod 231 corresponds to actuating rod 170, stops 255, 256 correspond to stops 171, 172. and aperture 253 corresponds to aperture 168.

The operating circuit 260 for controlling a flow of hydraulic fluid to and from the cylinder 250 to thereby allow movement of the pistons 251, 252, or lock them in the cylinder 250, involves a forward control position 24f control valve 261f and a rear control position 24r control valve 261r, each connected to a reservoir 265 by way of a check valve 266 and outstroke dashpot set 266' which allows flow from the valves 261 to the reservoir, and a check valve 267 and return stroke dashpot set 267' which allows flow from the reservoir 265 to the valves 261. When one of the control valves 261 is open the other is closed, thus ensuring operation is only carried out at one control position at a time. Operation of the dashpots 230 for the front control position 24f only will be described below.

Aperture 253 of the dashpot 230 is connected to one port 268 of the control valve 261f, while apertures 253l, 253r are both connected to the other port 269. As a result with operation of the valve 261 in one direction (downwards in FIG. 21), dashpot 230 can be locked with the other dashpots 230l, 230r unlocked. Conversely with operation of the valve 261 in the other direction (upwards in FIG. 21), dashpot 230 can be unlocked with the other dashpots 230l, 230r locked. In this way the pivot mounts 201, 202l, 202r of FIG. 17 can be locked and unlocked as required. It is also a feature that with control valve 261f in neutral, ie. no activation by either solenoid, the controls of control position 24f are all disabled (locked). Therefore it is only necessary to switch off the electrical supply to either control position 24f or 24r to achieve activation or deactivation (interlocking) of its respective controls.

Moreover, since the pistons 251, 252 are biased towards the ends of the cylinders 250 by the springs 254, then the actuating rods 231 will always return to a null position when a corresponding joystick 216, 240 is released, thus ensuring a constant null position for the control mechanism 160.

With such a construction the swash plate control levers 155, 156 may be moved together by means of the push-pull cables 161, 162, by operation of the joystick 216 of the first actuating linkage 211 to thus control synchronised drive of the first and third wheels at variable speeds in for example, a forward direction. This configuration may correspond to movement of the transporter at variable speeds with steering about a longitudinal direction (FIGS. 5, 6, 7, 8). The swash plate control levers 155, 156 may also be moved in opposite directions in direct inverse proportion to each other by operation of the joystick/twistgrip 240 of the second actuating linkage 212 to thus control synchronised drive of the wheels at varying speeds in for example opposite directions. This configuration may correspond to movement of the transporter at varying speeds in a sideways direction (as shown in FIG. 4) with the wheels turned in opposite directions so as to be parallel to each other, for example at right angles to the longitudinal direction. The swash plate control levers 155, 156 may also be moved in opposite directions in varying inverse proportion to each other by twist grip control of the joystick/twistgrip 240 to thus control drive of the wheels at varying relative speeds in for example opposite directions. With this additional configuration, the transporter may be steered when moving in the sideways direction (as shown in FIG. 4) by varying the relative speed of the wheels.

Figure 22:
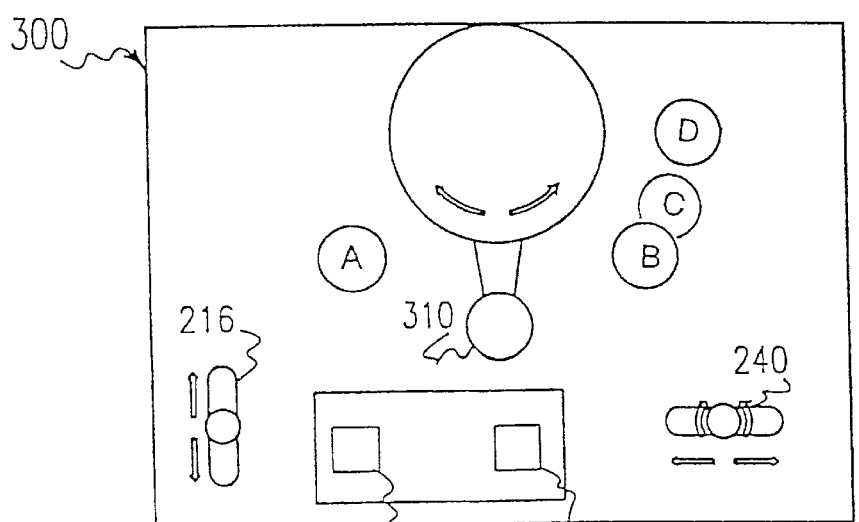
FIG. 22 is a schematic view of a control panel for the control system.

A control panel 300 for the above controls is shown in FIG. 22, and its location shown by a dotted line 300 in FIG. 19. Two of such control panels 300 are provided, one for each of the control positions 24f, 24r. The control panel 300 comprises the longitudinal control joystick 216, and the transverse control joystick/twistgrip 240 described beforehand with reference to FIGS. 19 and 20, which are mounted on the base frame 200 beneath the control panel 300. Deck controls 301, and engine controls 302 are provided on the control panel 300 between the joysticks 216, 240. The deck controls 301 operate the various valves in manifold E of FIG. 11 to thus operate the ramsets 50 and rollers 70 of the deck 60 for loading, and unloading containers and moving these on the deck 60. Engine controls 302 are for starting, and stopping the engine.

Steering control is by means of a control lever 310 which is movable about a vertical centre axis. The control lever 310 is connected directly to the steering column 94 of FIG. 12. For steering in the longitudinal direction as shown for example in FIGS. 6 and 7, the control lever 310 is moved about an arc indicated by the two arrows between positions A and B in FIG. 22, to steer in either direction by operation of the steering servo valve 45 of FIGS. 11 and 15. In this mode the dashpots 230l, 230r of the control mechanism 160 are locked so that the wheel motors 157 and 158 can be driven together at variable speeds in forward and reverse by operation of the longitudinal joystick 216. Position B is set so that steering to either side is symmetrical about a central axis. For rotation of the transporter about its center as shown in FIG. 5, the control lever 310 is moved past a detent to a latched position C (preset mode). For transverse motion, the control lever 310 is moved to a right latched position D (another preset mode), wherein the steering is locked for transverse motion as shown for example in FIG. 4. In this mode the dashpot 230 of the control mechanism 160 is locked so that the wheel motors 157 and 158 can be driven at variable speeds in opposite directions to each other by operation of the transverse control joystick 240 with steering twistgrip, to thus provide transverse motion with steering as shown for example in FIG. 4.

INDUSTRIAL APPLICABILITY

The wheeled load transporter or the present invention may be used as a means for the transportation and transfer of palletized loads within a cargo handling facility, in a flexible manner rather than along specific pathways to fixed transfer stations as with conventional systems, thus providing a more versatile system and minimising wastage of equipment. It will be appreciated however that it will have a wide variety of other industrial uses. Moreover the control system for the transporter of the present invention enables accurate control of movement of the transporter from either or two control positions with only one control position operative at a time, thus improving safety.

Finally it will be appreciated that various alterations or modifications may be made to the foregoing without departing from the scope of this invention as defined in the appended claims.

We claim:

1. A wheeled transporter for air cargo such as aircraft containers or palletised loads, said wheeled transporter comprising:

a load carrying platform having a length, breadth and thickness;

said platform supported by at least three ground engaging load carrying wheels, at least a first of said wheels being a steerable and drivable wheel and at least a second of said wheels being a castoring wheel not being capable of being driven; and a moving means for moving a load onto or off an upper surface of said load carrying platform, wherein a drive unit is connected to one side of the load carrying platform, and said first wheel is located beneath the drive unit, and wherein the drive unit extends above the upper surface of the load carrying platform, and the drive unit contains a power source to drive at least the first wheel.

2. A wheeled transporter as claimed in claim 1, wherein a plurality of castoring wheels, including said second wheel, are mounted beneath the load carrying platform.

3. A wheeled transporter as claimed in claim 2, wherein said plurality of castoring wheels are mounted along a side of the platform away from the drive unit.

4. A wheeled transporter as claimed in claim 3, wherein at least a first and a third of said wheels are steerable about respective substantially vertical axes, and further comprising steering means operable to steer said first and third wheels such that when the first wheel is turned in a clockwise direction about the vertical axis thereof the third wheel is turned in an anti-clockwise direction about the vertical axis thereof and vice versa.

5. A wheeled transporter as claimed in claim 4, wherein the drive unit extends above the upper surface of the load carrying platform, and the drive unit contains a power source to drive at least the first and third wheels.

6. A wheeled transporter as claimed in claim 5, wherein said first and third wheels are located beneath the drive unit.

7. A wheeled transporter as claimed in claim 6, wherein said third wheel is a steerable and drivable wheel.

8. A wheeled transporter as claimed in claim 7, wherein said first and third wheels have diameters greater than the thickness of the platform, so that the first and third wheels are larger than the castoring wheels.

9. A wheeled transporter as claimed in claim 8, wherein said first and third wheels can each be turned through a steering angle between 90 degrees and 180 degrees.

10. A wheeled transporter as claimed in claim 9, wherein at least one of the first and third wheels is brakable for additional transporter steering purposes independently of the other of the first and third wheels.

11. A wheeled transporter as claimed in claim 10, wherein the first and third wheels can be moved between a first position in which they are aligned to provide longitudinal movement of the transporter when the wheels are powered and a second position at right angles to the first position to provide transverse movement of the transporter when the wheels are powered.

12. A wheeled transporter as claimed in claim 11, wherein the first and third wheels can be adjusted to allow rotation of the transporter.

13. A wheeled transporter as claimed in claim 12, wherein a control position is provided on the transporter for a driver thereof, the control position comprising controls selected from driving, braking, and steering controls, and wherein the control position is located in or near a vertical plane through the steering axes of the first and third wheels.

14. A wheeled transporter as claimed in claims 13, wherein said moving means for moving a load onto or off said platform comprises a conveyor means.

15. A wheeled transporter as claimed in claim 14, wherein said platform includes a plurality of load presence detection means, and a controlling means for controlling said conveyor means in response to signals from the load presence detection means.

16. A wheeled transporter as claimed in claim 15, wherein said conveyor means comprises a plurality of rollers mounted on said platform.

17. A wheeled transporter as claimed in claim 16, wherein said rollers are mounted on the platform by adjustable mounts wherein said rollers may be raised or lowered.

18. A wheeled transporter as claimed in claim 17, wherein the rollers are arranged in groups.

19. A wheeled transporter as claimed in claim 18, wherein the orientation of some groups of rollers being different from the orientation of other groups of rollers such that a container may be moved in longitudinal and transverse directions by powering the appropriate rollers in said groups.

20. A wheeled transporter as claimed in claim 19, wherein the orientation of some groups of rollers being different from the orientation of other groups of rollers such that a container may be moved in longitudinal and transverse directions and rotated about a vertical axis by powering the appropriate rollers in said groups.

21. A wheeled transporter as claimed in claim 20, further comprising a servo-controlled steering system for steering of said first and third wheels, said steering system comprising a first and second hydraulic ram with piston rods thereof connected together for providing power to steer said first wheel and third wheels simultaneously but in opposite directions.

22. A wheeled transporter as claimed in claim 21, wherein said servo-controlled steering system further comprises a servo valve for controlling hydraulic fluid to said hydraulic rams mounted so as to move with said piston rods.

23. A wheeled transporter as claimed in claim 22, wherein said servo-controlled steering system further comprises a linkage means connected at one point to an operating member of said servo valve and operated by an input from a steering column to produce relative movement between said operating member and said servo valve to operate said valve to allow hydraulic fluid to flow to one or other of said hydraulic rams, and thus move said servo valve in a direction to reduce said relative movement.

24. A wheeled transporter as claimed in claim 23, further comprising a control system, said control system comprising a linkage assembly having a base frame, a first pivot mount and two second pivot mounts movably located relative to said frame member, first and second link arms each pivotally and respectively mounted at first and second ends thereof to said first pivot mount and said second pivot mounts, first actuating means mounted relative to said base frame for moving said first pivot mount, and second actuating means mounted relative to said base frame for moving said second pivot mounts together substantially in opposite directions in direct inverse proportion to each other, and first and second control means for respectively controlling forward and reverse drive of said first and third wheels, respectively linked to said first and second link arms such that pivotal movement of said link arms by said first and second actuating means causes corresponding movement of said control means.

25. A wheeled transporter as claimed in claim 24, wherein said second actuating means of said control system further comprises an adjustment device for moving said second pivot mounts in variable proportion relative to each other.

26. A wheeled transporter as claimed in claim 25, wherein the load carrying platform has a plurality of roller balls mounted thereon.

* * * * *